United States Patent
Jain et al.

(10) Patent No.: US 11,021,057 B2
(45) Date of Patent: Jun. 1, 2021

(54) TRANSFER CASE WITH RANGE AND MODE ACTUATOR HAVING CAM FOLLOWER MECHANISM TO OVERCOME BLOCKED SHIFT EVENTS AND SENSOR CONFIGURATION PERMITTING DETECTION OF FORK POSITIONS

(71) Applicant: BorgWarner, Inc., Auburn Hills, MI (US)

(72) Inventors: Abhinav Jain, Rochester, MI (US); Stephen D. Tucker, Muncie, IN (US); Travis J. Wentz, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 670 days.

(21) Appl. No.: 15/944,912

(22) Filed: Apr. 4, 2018

(65) Prior Publication Data

US 2019/0308500 A1     Oct. 10, 2019

(51) Int. Cl.
| | |
|---|---|
| *B60K 23/08* | (2006.01) |
| *B60K 17/344* | (2006.01) |
| *F16H 37/06* | (2006.01) |
| *F16H 63/18* | (2006.01) |
| *F16H 63/30* | (2006.01) |
| *B60K 17/08* | (2006.01) |

(52) U.S. Cl.
CPC .......... *B60K 23/0808* (2013.01); *B60K 17/08* (2013.01); *B60K 17/344* (2013.01); *F16H 37/065* (2013.01); *F16H 63/18* (2013.01); *F16H 63/304* (2013.01); *F16H 2063/3056* (2013.01)

(58) Field of Classification Search
CPC . B60K 23/0808; B60K 17/344; F16H 37/065; F16H 68/18; F16H 63/304; F16H 2063/3056
See application file for complete search history.

(56) References Cited

U.S. PATENT DOCUMENTS

| | | | | |
|---|---|---|---|---|
| 5,215,160 A * | 6/1993 | Williams | ........... | B60K 17/3465 180/197 |
| 5,330,030 A * | 7/1994 | Eastman | ................ | B60K 17/35 180/233 |
| 5,916,051 A * | 6/1999 | Schleuder | ............ | B60K 17/344 475/138 |
| 6,071,207 A * | 6/2000 | Stephens | ............ | B60K 17/3465 475/204 |

(Continued)

*Primary Examiner* — Ha Dinh Ho
(74) *Attorney, Agent, or Firm* — Burris Law, PLLC (57) ABSTRACT

A transfer case with an actuator for operating a two-speed transmission (i.e., range mechanism) and a clutch (i.e., mode mechanism). The actuator employs a motor-driven cam structure that coordinates the movement of a first fork, which is associated with the range mechanism, and a second fork that is associated with the mode mechanism. A resilient coupling is employed to provide compliance between the motor and the cam structure in the event that tooth-on-tooth contact inhibits the range mechanism from changing from a high-range mode and a low range mode. Compliance is provided between the cam structure and the second fork in the event that tooth-on-tooth contact inhibits the mode mechanism from changing from a 2WD mode to a 4WD mode. A sensor system identifies the placement of the first and second forks in various positions and responsively generates associated sensor signals.

9 Claims, 7 Drawing Sheets

(56) References Cited

U.S. PATENT DOCUMENTS

| | | |
|---|---|---|
| 7,240,577 B2 | 7/2007 | Choi et al. |
| 9,500,237 B2 | 11/2016 | Downs |
| 10,464,415 B2 * | 11/2019 | Sharma .............. B60K 17/3467 |

* cited by examiner

TRANSFER CASE WITH RANGE AND MODE ACTUATOR HAVING CAM FOLLOWER MECHANISM TO OVERCOME BLOCKED SHIFT EVENTS AND SENSOR CONFIGURATION PERMITTING DETECTION OF FORK POSITIONS

FIELD

The present disclosure relates to a transfer case with a range and mode actuator. The actuator employs a follower mechanism that overcomes blocked shift events, as well as a sensor configuration that permits detection of the range and mode forks at various fork positions.

BACKGROUND

This section provides background information related to the present disclosure which is not necessarily prior art.

Commonly assigned U.S. Pat. No. 5,584,776 discloses a transfer case having a two-speed transmission and a mode clutch whose operation is controlled by an actuator that employs a pair of rotary cams to translate a pair of forks. The cam that is associated with the fork for the two-speed transmission is coupled to an output shaft of an electric motor by a torsion spring. The torsion spring provides compliance between the rotary position of the motor and the rotary positon of the cam in situations where the fork for the two-speed transmission cannot be moved due to a blocked shifting event in which teeth on a movable element in the two-speed transmission abut and do not engage with mating teeth on another component of the transmission.

U.S. Pat. No. 7,240,577 also discloses a transfer case having a two-speed transmission and a mode clutch whose operation is controlled by a pair of rotary cams to translate a pair of forks.

SUMMARY

This section provides a general summary of the disclosure, and is not a comprehensive disclosure of its full scope or all of its features.

In one form, the present teachings provide a transfer case that includes a housing and an actuator. The actuator has a motor and cam assembly, a fork shaft, a first fork, a second fork, a first sensor and a second sensor. The motor and cam assembly is coupled to the housing and has a motor, which has a motor output shaft, and a cam structure. The cam structure is driven about a cam axis by the motor output shaft through a resilient rotary coupling. The cam structure has a body, which extends along the cam axis, and an axial end. The body defines a cam track having a first track portion, a second track portion that is spaced apart from the first track portion along the cam axis, and a track connecting portion that spirals along and about the cam axis to connect the first and second track portions. The axial end defines a face cam having a first face cam portion, a second face cam portion and a connecting face cam portion. The first face cam portion is spaced apart from the second face cam portion along the cam axis. The connecting face cam portion connects the first and second face cam portions to one another. The fork shaft is coupled to the housing and extends along a fork shaft axis that is parallel to the cam axis. The first fork is received in the housing and has a first mount, a first fork member, a first cam follower and a first sensor target. The first mount is received on the fork shaft for sliding movement along the fork shaft axis. The first fork member extends from the first mount and has a pair of first fork tines that are disposed about an actuation axis that is parallel to the fork shaft axis. The first cam follower is coupled to the first mount and is received into the cam track such that rotation of the cam structure about the cam axis between a first rotary cam position and a second rotary cam position causes corresponding translation of the first fork along the actuation axis between a first position and a second position. The first sensor target is fixedly coupled to the first mount. The second fork is received in the housing and has a second mount, a second fork member, a second cam follower and a second sensor target. The second mount is received on the fork shaft for sliding movement along the fork shaft axis. The second fork member extends from the second mount and has a pair of second fork tines that are disposed about an actuation axis that is parallel to the fork shaft axis. The second cam follower is coupled to the second mount and is abutted against the face cam such that rotation of the cam structure about the cam axis between the first rotary cam position and the second rotary cam position causes corresponding translation of the second fork along the actuation axis between a third position and a fourth position. The second sensor target is fixedly coupled to the second mount. The first sensor is coupled to the housing and is configured to sense the first sensor target and responsively generate a first sensor signal when the first sensor target is in at least one position along the fork shaft axis. The second sensor is coupled to the housing and is configured to sense the second sensor target and responsively generate a second sensor signal when the second sensor target is in at least one position along the fork shaft axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
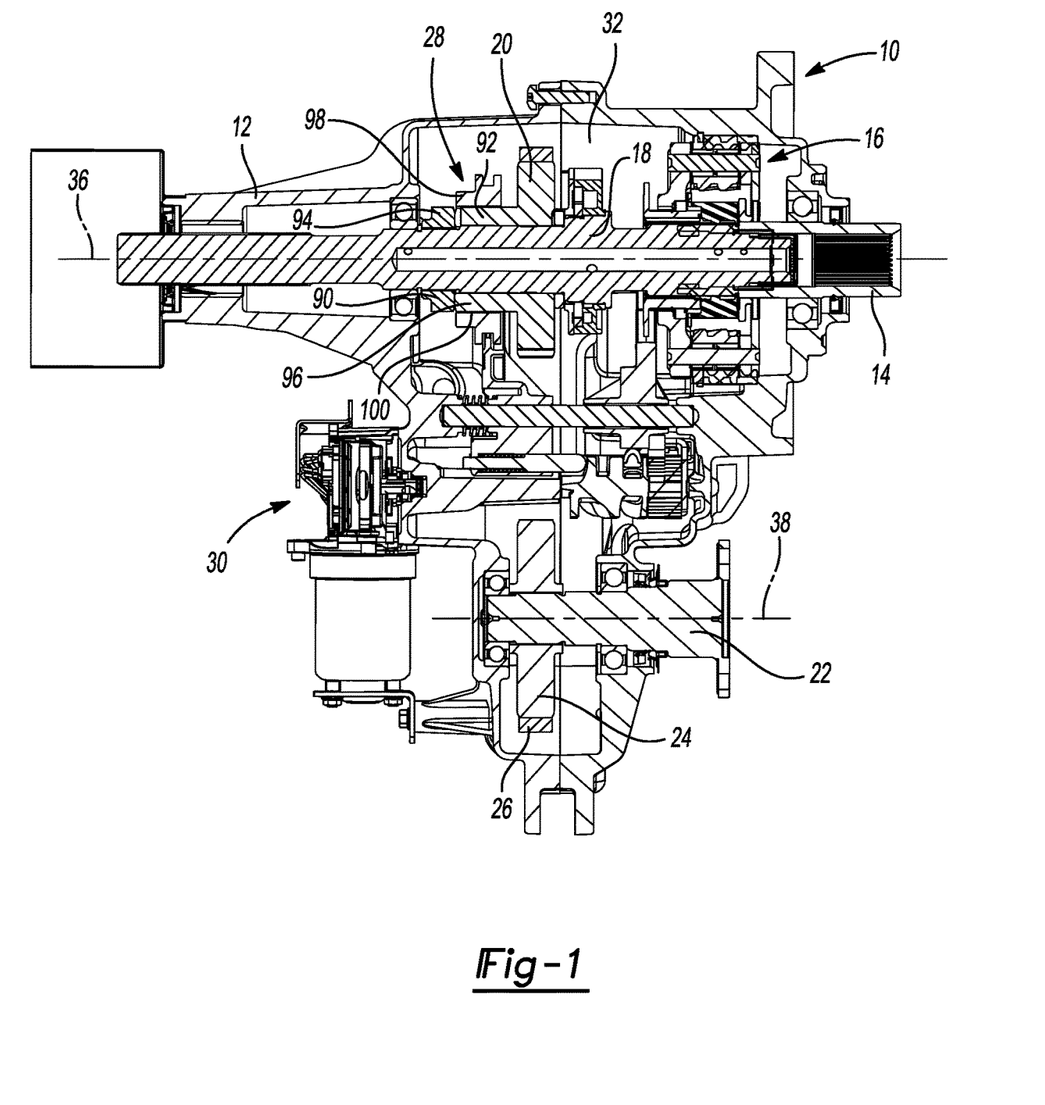
FIG. 1 is a cross-sectional view of an exemplary transfer case constructed in accordance with the teachings of the present disclosure.

With reference to FIG. 1, an exemplary transfer case constructed in accordance with the teachings of the present disclosure is generally indicated by reference numeral 10. The transfer case 10 can include a housing 12, an input shaft 14, a two-speed transmission 16, a first output shaft 18, a first sprocket 20, a second output shaft 22, a second sprocket 24, a chain 26, a clutch 28 and an actuator 30. The housing 12 can define an internal cavity 32. The input shaft 14 can extend into the internal cavity 32 and can be supported by the housing 12 for rotation about a primary axis 36. The first output shaft 18 can be received in the internal cavity 32 and can be supported by the housing 12 for rotation about the primary axis 36. The second output shaft 22 can be received in the internal cavity 32 and can be supported by the housing 12 for rotation about a secondary axis 38 that can be spaced apart from the primary axis 36. The primary and secondary axes 36 and 38 can be parallel to one another.

Figure 2:
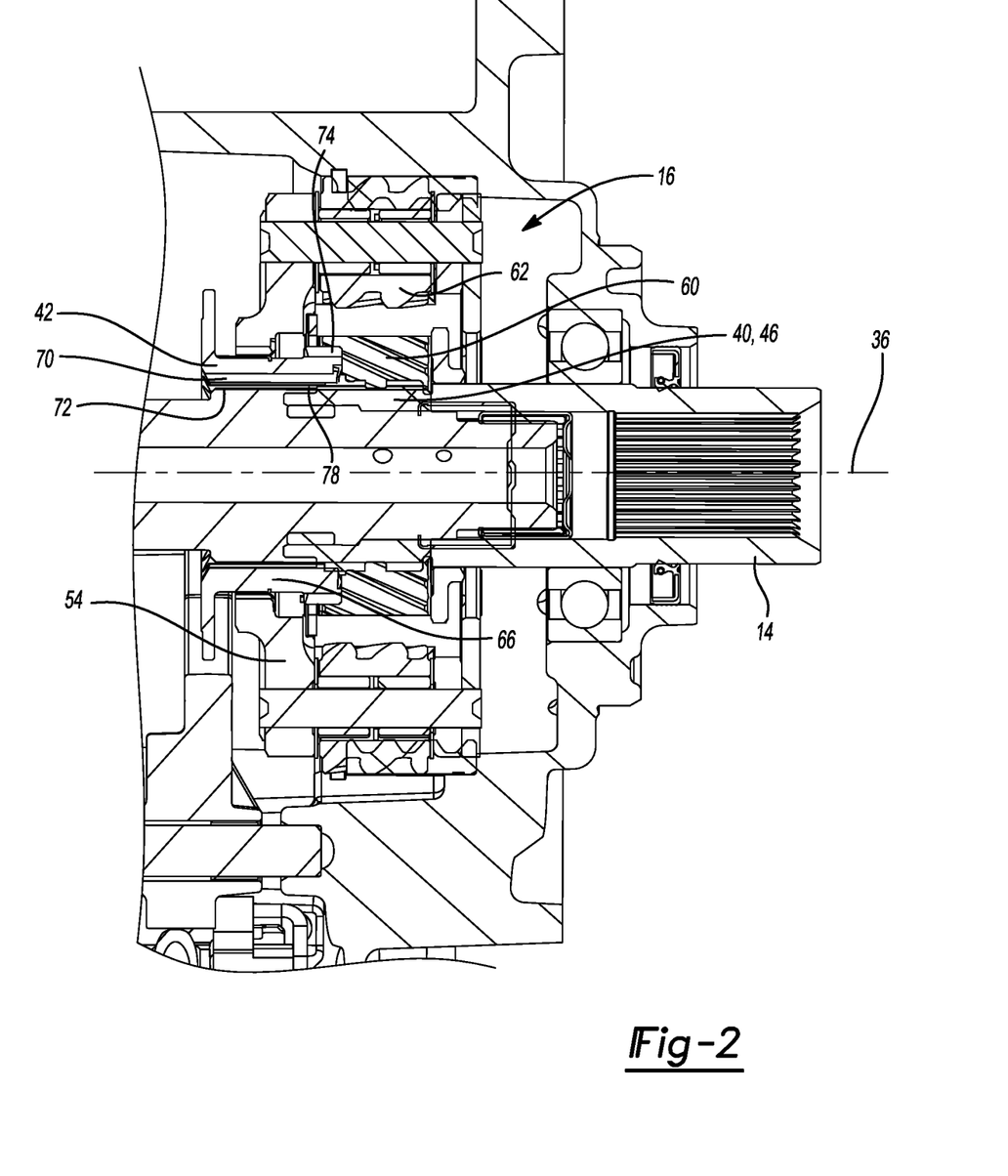
FIG. 2 is an enlarged portion of FIG. 1 illustrating a two-speed transmission in more detail.

With reference to FIG. 2, the two-speed transmission 16 can have a transmission input member 40, which can be coupled to the input shaft 14 for rotation therewith, and a transmission output member 42 that can be coupled to the first output shaft 18 for rotation therewith. In the example provided, the two-speed transmission 16 is a planetary transmission having a sun gear 46, a ring gear 48, a planet carrier 50 and a plurality of planet gear sets 52. The sun gear 46 is the transmission input member 40 in the example provided and can be integrally formed with or fixedly coupled to the input shaft 14. The ring gear 48 can be fixedly coupled to the housing 12. The planet carrier 50 can include a carrier body 54 and a plurality of carrier pins 56 that can be fixedly coupled to and circumferentially spaced about the carrier body 54. Each of the planet gear sets 52 can include one or more planet gears that can be journally (rotatably) disposed on a corresponding one of the carrier pins 56. Each planet gear set 52 can be meshingly engaged with the sun gear 46 and the ring gear 48. In the particular example provided, each planet gear set 52 includes a first planet gear 60, which is meshingly engaged with the sun gear 46, and a second planet gear 62 that is meshingly engaged with both the ring gear 48 and the first planet gear 60 of the planet gear set 52. It will be appreciated, however, that each of the planet gear sets 52 could be configured with a single planet gear (not shown) that meshingly engages both the sun gear 46 and the ring gear 48. The transmission output member 42 can include a sleeve-like structure 66 and flange member 68 that can extend radially outwardly from the sleeve-like structure 66. The sleeve-like structure 66 can have a plurality of internal spline teeth 70, which can be meshingly engaged to external spline teeth 72 formed on the first output shaft 18, and a set of external teeth 74. The transmission output member 42 can be moved along the primary axis 36 between a high-range position, in which the internal spline teeth 70 on the transmission output member 42 are also engaged to internal spline teeth 78 formed on the input shaft 14 (to thereby rotatably couple the first output shaft 18 and the transmission output member 42 to the input shaft 14 and the transmission input member 40/sun gear 46), and a low-range position in which the external teeth 74 on the transmission output member 42 are engaged to internal teeth 80 formed on the carrier body 54 of the planet carrier 50 (to thereby rotatably couple the first output shaft 18 and the transmission output member 42 to the planet carrier 50).

Returning to FIG. 1, the first sprocket 20 can be rotatably disposed on the first output shaft 18, while the second sprocket 24 can be non-rotatably coupled to the second output shaft 22. The chain 26 can be disposed around and can engage the first and second sprockets 20 and 24 to permit rotary power to be transmitted between the first and second sprockets 20 and 24.

The clutch 28 can be any type of clutch or coupling that can be employed to selectively transmit rotary power between the first output shaft 18 and the first sprocket 20. In this regard, the clutch 28 can have a first clutch member 90, which can be coupled to the first output shaft 18 for rotation therewith, and a second clutch member 92 that can be coupled to the first sprocket 20 for rotation therewith. The clutch 28 can be selectively operated in a first clutch mode, in which the first and second clutch members 90 and 92 are rotationally de-coupled from one another to thereby inhibit the transmission of rotary power between the input shaft 14 and the first sprocket 20, and a second clutch mode in which the first and second clutch members 90 and 92 are rotationally coupled to one another to thereby permit the transmission of rotary power between the input shaft 14 and the first sprocket 20. In the particular example provided, the first clutch member 90 is splined to the input shaft 14 and includes external teeth 94, the second clutch member 92 is integrally formed with the first sprocket 20 and includes external teeth 96, and the clutch 28 includes a sleeve-shaped third clutch member 98 with internal teeth 100 that permit the third clutch member 98 to be non-rotatably but axially slidably coupled to the second clutch member 92 (via engagement of the internal teeth 100 with the external teeth 96) and selectively movable into a position where the third clutch member 98 additionally engages the first clutch member 90 (via engagement of the internal teeth 100 with the external teeth 94) when the clutch 28 is operated in the second clutch mode. While the third clutch member 98 has been described as being engaged to the second clutch member 92 and movable into a position where it is also engaged to the first clutch member 90, it will be appreciated that the third clutch member 98 could be engaged to the first clutch member 90 and movable into a position where it is also engaged to the second clutch member 92.

Figure 8:
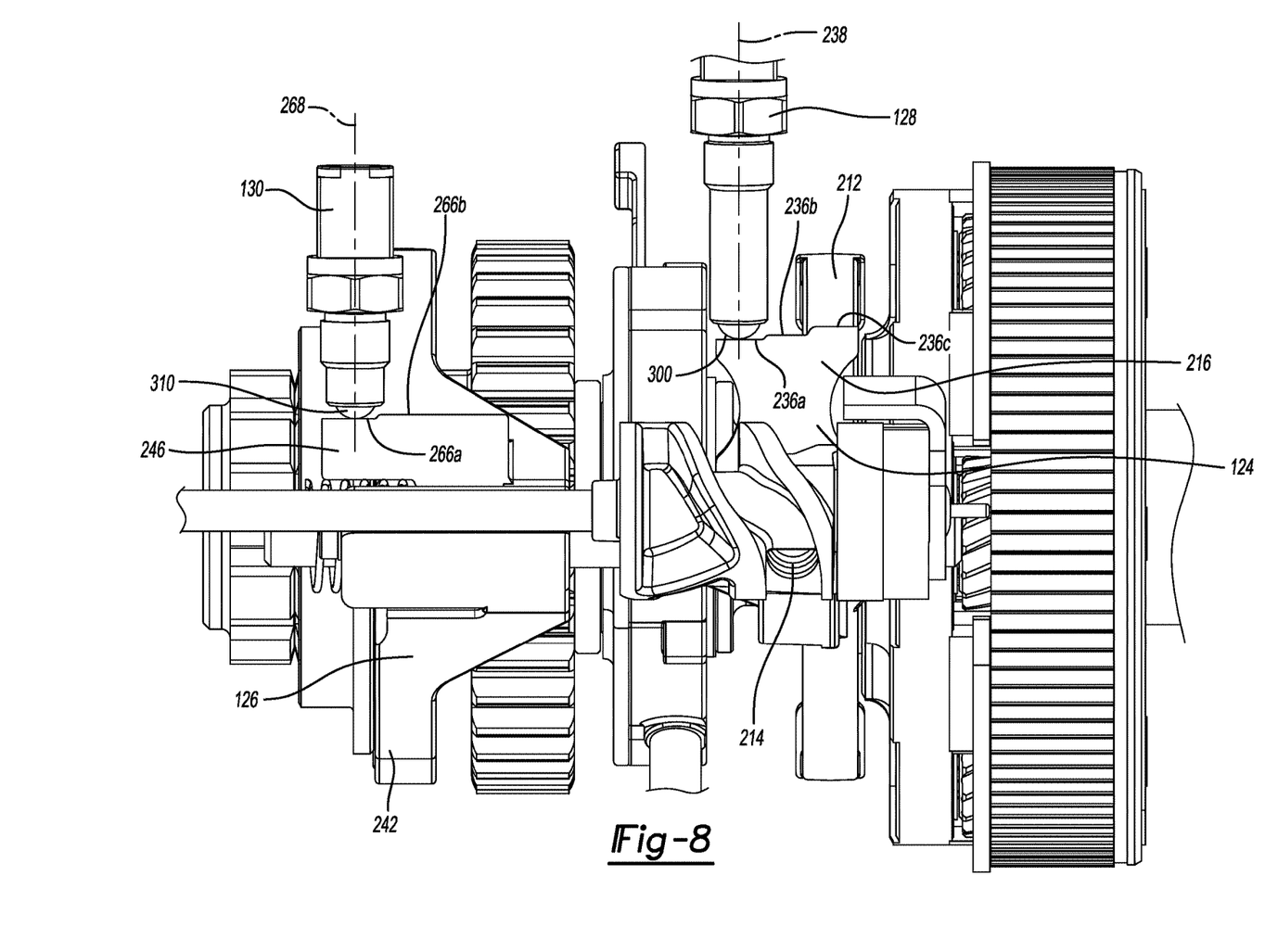
FIG. 8 is an elevation view of a portion of the transfer case of FIG. 1 depicting first and second sensors engaged to first and second sensor targets, respectively.

The actuator 30 can include a motor and cam assembly 120, a fork shaft 122, a first fork 124, a second fork 126, a first sensor 128 (FIG. 8) and a second sensor 130 (FIG. 8). The motor and cam assembly 120 can be coupled to the housing 12 and can include a motor assembly 140 and a cam structure 142. The motor assembly 140 can be configured in a manner that is described in commonly assigned U.S. Pat. No. 5,584,776. Briefly, the motor assembly 140 can have a motor 150 and a resilient rotary coupling 152. The motor 150 has a motor output shaft 154 that can drive the cam structure 142 about a cam axis 158 through the resilient rotary coupling 152. The resilient rotary coupling 152 can include a torsion spring 160 and is configured to permit rotation of the motor output shaft 154 relative to the cam structure 142 in instances where movement of the transmission output member 42 into the low-range position is inhibited due to tooth-on-tooth contact between the external teeth 74 on the transmission output member 42 and the internal teeth 80 formed on the carrier body 54 of the planet carrier 50. In the example provided, the cam structure 142 is non-rotatably coupled to an intermediate shaft 164 (FIG. 4) and the torsion spring 160 is disposed in a torque transmission path between the motor output shaft 154 and the intermediate shaft 164 (FIG. 4).

Figure 4:
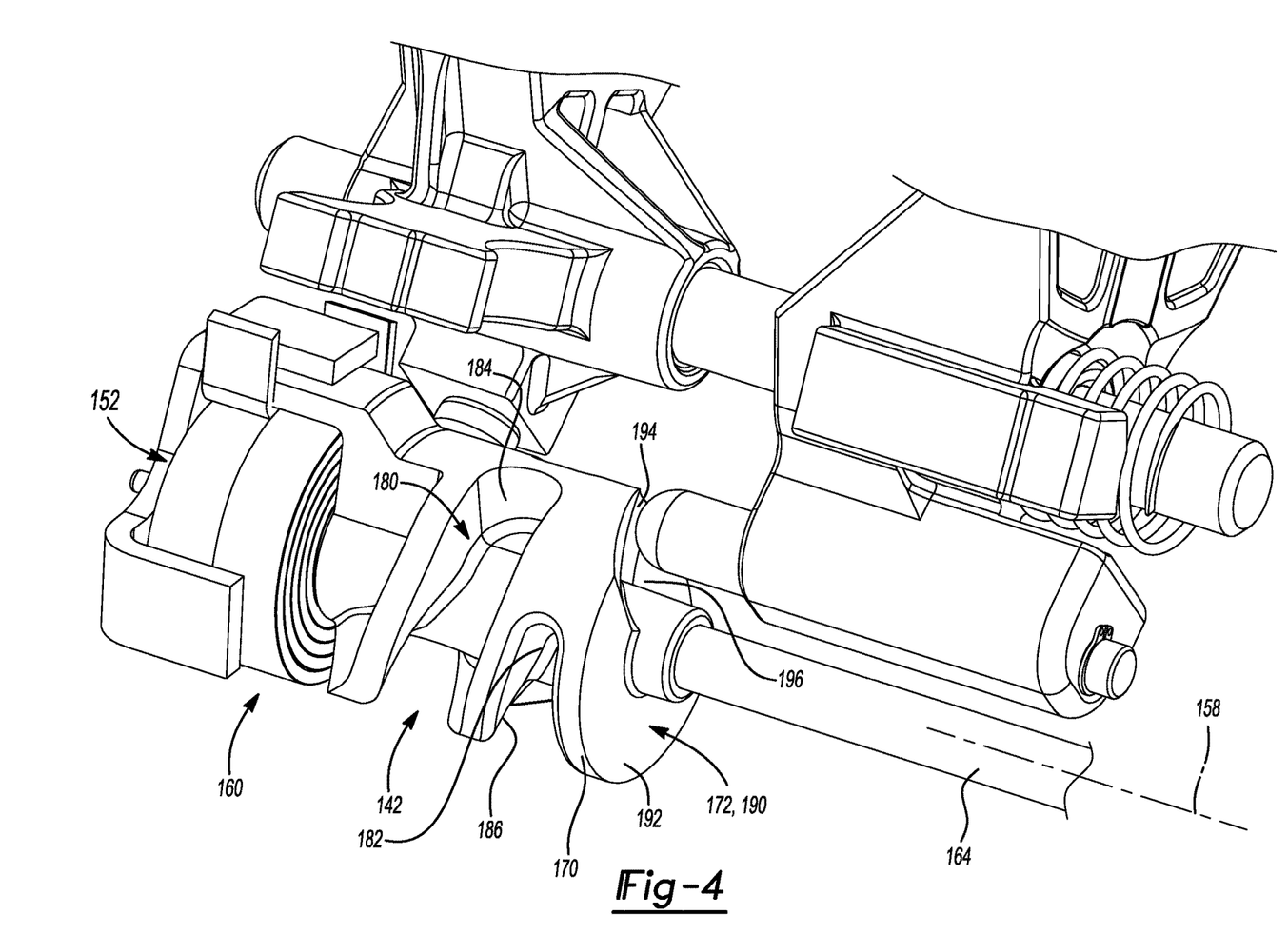
FIG. 4 is a perspective view of portion of the actuator illustrating a cam structure in more detail.
Figure 5:
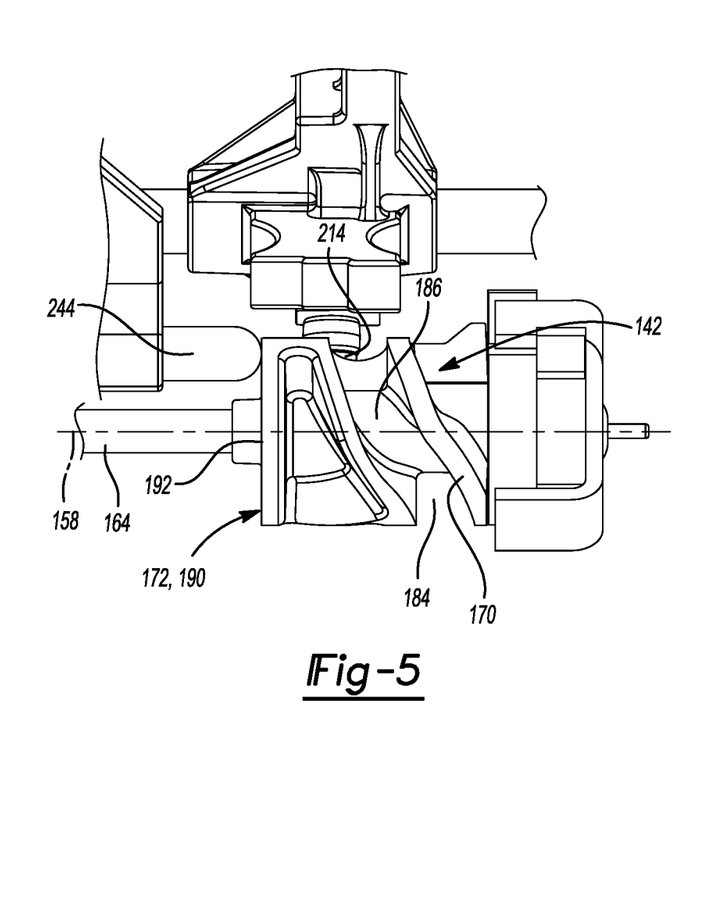
FIGS. 5 and 6 are front elevation views of a portion of the actuator depicting the cam structure in first and second positions, respectively.
Figure 6:
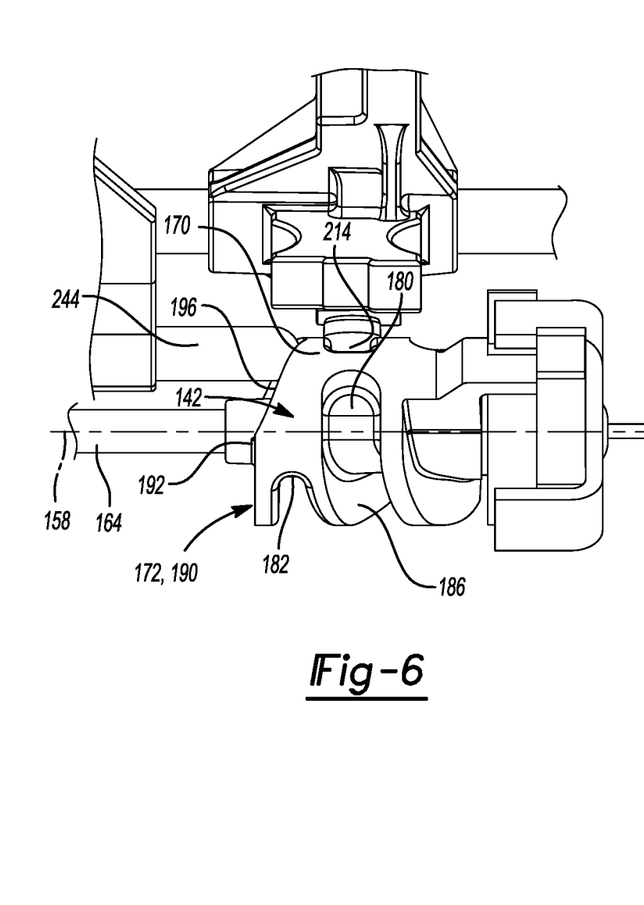

With reference to FIGS. 4 through 6, the cam structure 142 can have a body 170 and an axial end 172. The body 170 can extend along the cam axis 158 and can define a cam track 180 having a first track portion 182, a second track portion 184, which is spaced apart from the first track portion 182 along the cam axis 158, and a track connecting portion 186 that spirals along and about the cam axis 158 to connect the first and second track portions 182 and 184. In the example provided, each of the first and second track portions 182 and 184 extend solely about a portion of the circumference of the body 170 and do not spiral along the cam axis 158. The axial end 172 could be either axial end of the cam structure 142, such as the axial end of the cam structure 142 that faces the motor 150. The axial end 172 can define a face cam 190 having a first face cam portion 192, a second face cam portion 194, which is spaced apart from the first face cam portion 192 along the cam axis 158, and a connecting face cam portion 196 that connects the first and second face cam portions 192 and 194.

Returning to FIG. 3, the fork shaft 122 can be fixedly coupled to the housing 12 in any desired manner and can extend along a fork shaft axis 200 that is parallel to the cam axis 158. In the example provided, the opposite axial ends of the fork shaft 122 are received into holes 202 formed in the housing 12 such that the housing 12 captures the fork shaft 122 in a manner that limits or inhibits movement of the fork shaft 122 relative to the housing 12 along the fork shaft axis 200.

The first fork 124 is received in the housing 12 and has a first mount 210, a first fork member 212, a first cam follower 214 and a first sensor target 216 (FIG. 8). The first mount 210 is received on the fork shaft 122 for sliding movement along the fork shaft axis 200. More specifically, the first mount 210 defines a shaft aperture 220 into which the fork shaft 122 is received. The first fork member 212 extends from the first mount 210 and can engage the transmission output member 42 in a manner that inhibits relative axial movement there between but which permits rotation of the transmission output member 42 relative to the first mount 210. The first fork member 212 can be a generally U-shaped or C-shaped structure having a pair of first fork tines 226 that can be disposed about an actuation axis 230 that is coincident with the primary axis 36 and parallel to the fork shaft axis 200. In the particular example provided, the first fork tines 226 define a slotted recess 234 into which the flange member 68 of the transmission output member 42 is received. It will be appreciated that receipt of the flange member 68 into the slotted recess 234 permits relative rotation between the flange member 68/transmission output member 42 and the first fork 124 while limiting or inhibiting relative axial movement between the first fork 124 and the flange member 68/transmission output member 42 along the primary axis 36. The first cam follower 214 can be coupled to the first mount 210 and can be received into the cam track 180 such that rotation of the cam structure 142 about the cam axis 158 between a first rotary cam position (FIGS. 3 & 5) and a second rotary cam position (FIG. 6) causes corresponding translation of the first fork 124 along the fork shaft axis 200 and the actuation axis 230 between a first position, in which the transmission output member 42 is disposed in the low-range position, and a second position in which the transmission output member 42 is disposed in the high-range position. With brief additional reference to FIG. 8, the first sensor target 216 is fixedly coupled to the first mount 210 and is configured to interact with the first sensor 128 in a manner that permits the first sensor 128 to sense a position of the first fork 124 and responsively generate a first sensor signal. In the particular example provided, the first sensor target 216 defines first, second and third sensing planes 236*a*, 236*b* and 236*c*, respectively, that are spaced vertically from one another in a direction that is parallel to a first sensing axis 238 of the first sensor 128.

Returning to FIG. 3, the second fork 126 is received in the housing 12 and can have a second mount 240, a second fork member 242, a second cam follower 244 and a second sensor target 246 (FIG. 8). The second mount 240 is received on the fork shaft 122 for sliding movement along the fork shaft axis 200. More specifically, the second mount 240 defines a shaft aperture 250 into which the fork shaft 122 is received. The second fork member 242 extends from the second mount 240 and can engage the third clutch member 98 in a manner that inhibits relative axial movement there between but which permits rotation of the third clutch member 98 relative to the second mount 240. The second fork member 242 can be a generally U-shaped or C-shaped structure having a pair of second fork tines 256 that can be disposed about an actuation axis 230 that is coincident with the primary axis 36 and parallel to the fork shaft axis 200. In the particular example provided, the second fork tines 256 define a pair of circumferentially extending projections that are received into which a circumferentially extending groove 258 on the outside surface of the third clutch member 98. It will be appreciated that receipt of the circumferentially extending projections into the circumferentially extending groove 258 permits relative rotation between the third clutch member 98 and the second fork 126 while limiting or inhibiting relative axial movement between the second fork 126 and the third clutch member 98 along the primary axis 36.

Figure 3:
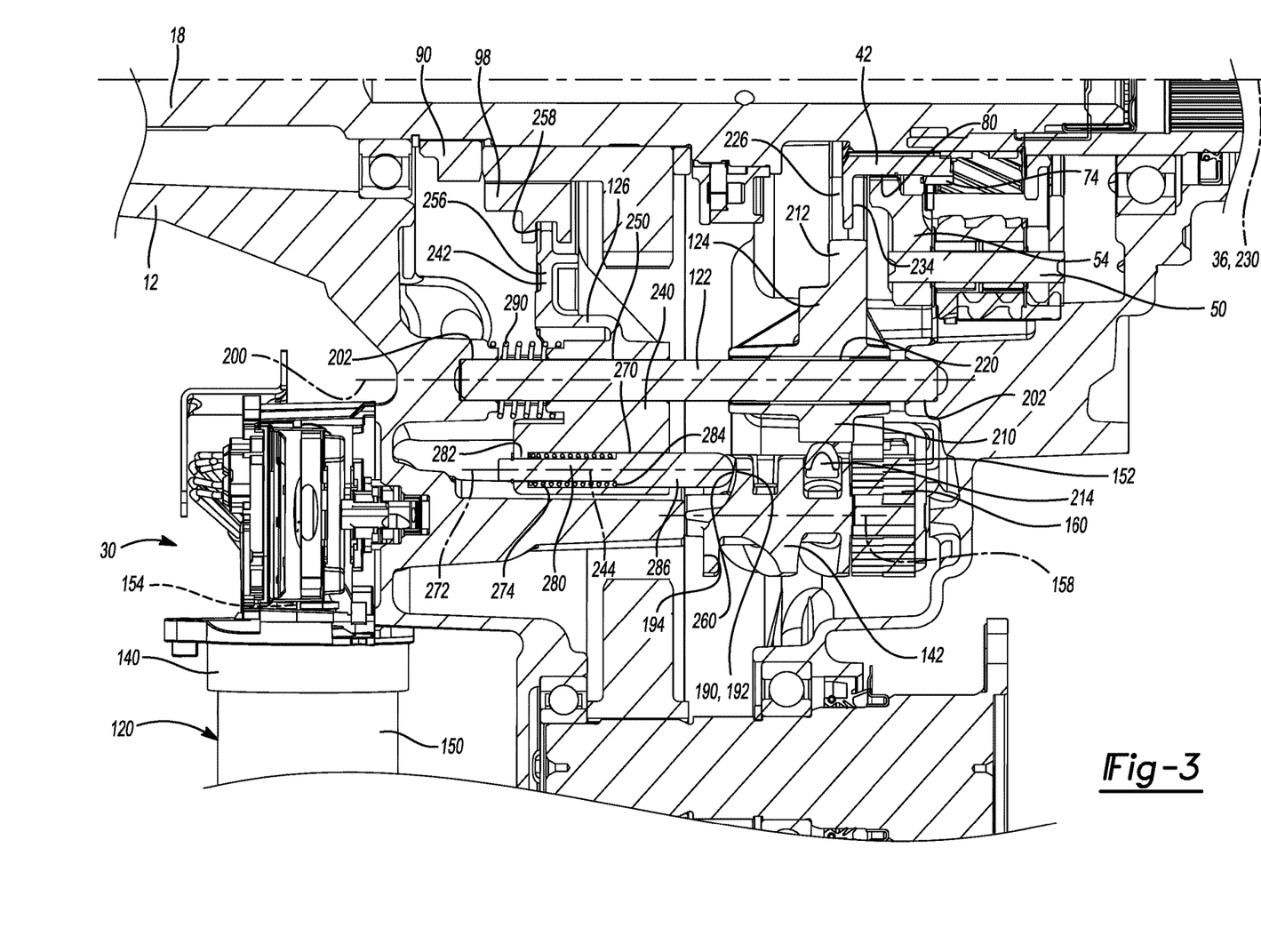
FIG. 3 is an enlarged portion of FIG. 1 illustrating an actuator in more detail.

The second cam follower 244 can be coupled to the second mount 240 and can have a tip portion 260 that is defined by a spherical radius and abutted against the face cam 190. In the example provided, the second cam follower 244 is slidably received into a follower aperture 270 formed in the second mount 240 such that the second cam follower 244 is movable relative to the second mount 240 along a cam follower axis 272 that is parallel to the cam axis 158. Optionally, a follower spring 274 can be employed to bias the second cam follower 244 along the cam follower axis 272 in a direction away from the second mount 240 and toward the cam structure 142. The follower spring 274 can be a helical coil compression spring that can be disposed about a necked-down segment 280 formed on the second cam follower 244. A first axial end of the follower spring 274 can be abutted against a shoulder 282 formed in the second mount 240 by the follower aperture 270, while a second, opposite axial end of the follower spring 274 can be abutted against a shoulder 284 formed where the necked-down segment 280 intersects a remaining, larger diameter portion 286 of the second cam follower 244. Optionally, a fork return spring 290 can be employed to bias the second fork 126 toward one of the third and fourth positions. In the example provided, the fork return spring 290 is a helical compression spring that is disposed about the fork shaft 122 between the housing and the second mount 240 and which is configured to bias the second fork 126 toward the third position to thereby bias the third clutch member 98 along the primary axis 36 in a direction away from (and out of engagement with) the first clutch member 90. With brief additional reference to FIG. 8, the second sensor target 246 can be fixedly coupled to the second mount 240 and is configured to interact with the second sensor 130 in a manner that permits the second sensor 130 to sense a position of the second fork 126 and responsively generate a second sensor signal. In the particular example provided, the second sensor target 246 defines first and second sensing planes 266*a* and 266*b*, respectively, that are spaced vertically from one another in a direction that is parallel to a sensing axis 268 of the second sensor 130.

Figure 7:
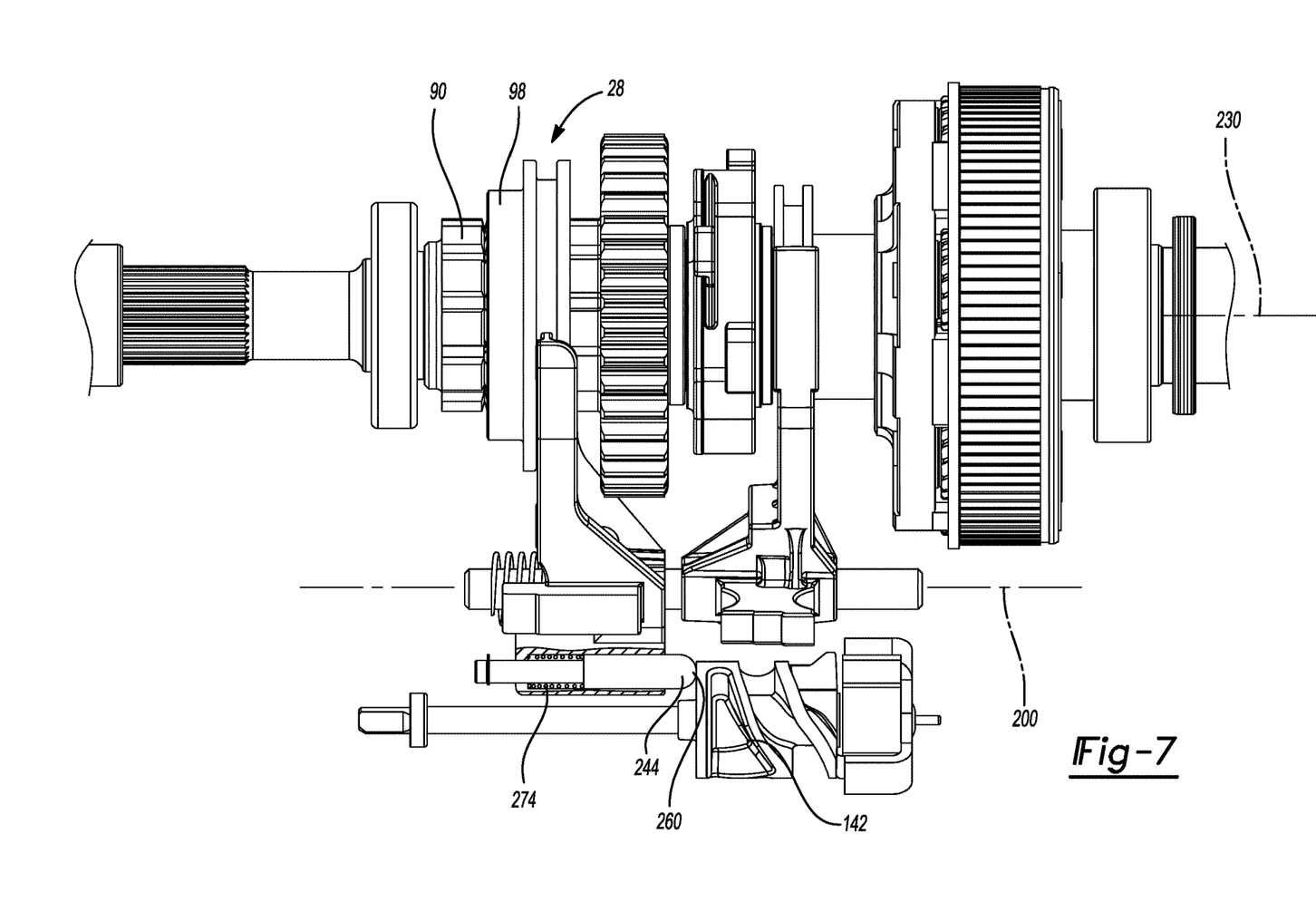
FIG. 7 is a partly sectioned elevation view of the transfer case of FIG. 1 depicting compliance between a second cam follower and the cam structure in an instance where tooth-on-tooth contact between elements of a mode clutch prevent those element from engaging one another.

With reference to FIGS. 3, 5 and 6, rotation of the cam structure 142 about the cam axis 158 between the first rotary cam position and the second rotary cam position causes corresponding translation of the second fork 126 along the actuation axis 230 between a third position, in which the third clutch member 98 is rotationally de-coupled from the first clutch member 90 so that the clutch 28 operates in the first clutch mode, and a fourth position in which the third clutch member 98 is rotationally coupled to the first clutch member 90 so that the clutch 28 operates in the second clutch mode. Placement of the cam structure 142 in the first rotary cam position aligns first face cam portion 192 of the face cam 190 to the tip portion 260 of the second cam follower 244, which permits the fork return spring 290 to urge the second fork 126 into the third position. Rotation of the cam structure 142 from the first rotary cam position to the second rotary cam portion in a first rotational direction causes the tip portion 260 of the second cam follower 244 to traverse over the connecting face cam portion 196, which urges the second cam follower 244 along the cam follower axis 272 in a direction away from the cam structure 142. In situations where the third clutch member 98 is able to engage the first clutch member 90, movement of the second cam follower 244 away from the cam structure 142 will cause corresponding motion of the second fork 126 and associated compression of the fork return spring 290 so that when the third clutch member 98 engages the first clutch member 90 when the tip portion 260 is disposed on the second face cam portion 194 of the face cam 190. In situations where the third clutch member 98 is not able to engage the first clutch member 90 (i.e., due to a tooth-on-tooth condition between the third and first clutch members 90 and 98), movement of the second cam follower 244 away from the cam structure 142 as the tip portion 260 traverses over the connecting face cam portion 196 will cause the follower spring 274 to compress between the second mount 240 and the second cam follower 244 as shown in FIG. 7 so that the cam structure 142 can be fully rotated to the second cam position despite the fact that the second fork 126 cannot be further translated to cause the clutch 28 to operate in the second clutch mode. The force stored in the (compressed) follower spring 274 can urge the second fork 126 along the fork shaft axis 200/actuation axis 230 to cause the third clutch member 98 to engage the first clutch member 90 when internal teeth of the third clutch member 98 are able to receive and engage the external teeth of the first clutch member 90.

With reference to FIG. 8, the first sensor 128 can be any type of sensor that is configured to sense a position of the first sensor target 216 and responsively generate a first sensor signal that is indicative of a position of the first fork 124 relative to the housing 12 (FIG. 1) along the fork shaft axis 200/actuation axis 230. For example, the first sensor 128 could be a type of Hall-effect, proximity or eddy current sensor. In the particular example provided, the first sensor 128 has a probe 300 that is movable about the first sensing axis 238 and which contacts the first, second and third sensing planes 236a, 236b and 236c as the first fork 124 is moved along the fork shaft axis 200/actuation axis 230 (FIG. 3) between a first position, which corresponds to the high-range position of the transmission output member 42 (FIG. 2), a second position, which corresponds to placement of the transmission output member 42 (FIG. 2) in a neutral positon that is disengaged from both the input shaft 14 (FIG. 2) and the planet carrier 50 (FIG. 2), and a low-range position, which corresponds to placement of the transmission output member 42 (FIG. 2) in the low-range position, respectively. The first sensor 128 could be configured to output an analog signal (e.g., voltage) that is related to the position of the probe 300 in a continuous and direct manner (i.e., a con- tinuously variable manner) or in a discontinuous, stepped manner. Alternatively, the first sensor 128 could be configured to output a digital signal that is related to the position of the probe 300 in a continuous and direct manner or in a discontinuous, stepped manner.

Similarly, the second sensor 130 can be any type of sensor that is configured to sense a position of the second sensor target 246 and responsively generate a second sensor signal that is indicative of a position of the second fork 126 relative to the housing 12 (FIG. 1) along the fork shaft axis 200/ actuation axis 230 (FIG. 3). For example, the second sensor 130 could be a type of Hall-effect, proximity or eddy current sensor. In the particular example provided, the second sensor 130 has a probe 310 that is movable about the second sensing axis 268 and which contacts the first and second and third sensing planes 266a and 266b as the second fork 126 is moved along the fork shaft axis 200/actuation axis 230 between a first position, which corresponds to the operation of the clutch 28 (FIG. 1) in the first clutch mode, a second position, which corresponds to operation of the clutch 28 (FIG. 1) in the second clutch mode, respectively. The second sensor 130 could be configured to output an analog signal (e.g., voltage) that is related to the position of the probe 310 in a continuous and direct manner (i.e., a continuously variable manner) or in a discontinuous, stepped manner. Alternatively, the second sensor 130 could be configured to output a digital signal that is related to the position of the probe 310 in a continuous and direct manner or in a discontinuous, stepped manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
 a housing; and
 an actuator with a motor and cam assembly, a fork shaft, a first fork, a second fork, a first sensor and a second sensor, the motor and cam assembly being coupled to the housing and having a motor and a cam structure, the motor having a motor output shaft, the cam structure being driven about a cam axis by the motor output shaft through a resilient rotary coupling, the cam structure having a body, which extends along the cam axis, and an axial end, the body defining a cam track having a first track portion, a second track portion that is spaced apart from the first track portion along the cam axis, and a track connecting portion that spirals along and about the cam axis to connect the first and second track portions, the axial end defining a face cam having a first face cam portion, a second face cam portion and a connecting face cam portion, the first face cam portion being spaced apart from the second face cam portion along the cam axis, the connecting face cam portion connecting the first and second face cam portions to one another, the fork shaft being coupled to the housing and extending along a fork shaft axis that is parallel to the cam axis, the first fork being received in the housing and having a first mount, a first fork member, a first cam follower and a first sensor target, the first mount being received on the fork shaft for sliding movement along the fork shaft axis, the first fork member extending from the first mount and having a pair of first fork tines that are disposed about an actuation axis that is parallel to the fork shaft axis, the first cam follower being coupled to the first mount and being received into the cam track such that rotation of the cam structure about the cam axis between a first rotary cam position and a second rotary cam position causes corresponding translation of the first fork along the actuation axis between a first position and a second position, the first sensor target being fixedly coupled to the first mount, the second fork being received in the housing and having a second mount, a second fork member, a second cam follower and a second sensor target, the second mount being received on the fork shaft for sliding movement along the fork shaft axis, the second fork member extending from the second mount and having a pair of second fork tines that are disposed about the actuation axis, the second cam follower being coupled to the second mount and being abutted against the face cam such that rotation of the cam structure about the cam axis between the first rotary cam position and the second rotary cam position causes corresponding translation of the second fork along the actuation axis between a third position and a fourth position, the second sensor target being fixedly coupled to the second mount, the first sensor being coupled to the housing and being configured to sense the first sensor target and responsively generate a first sensor signal when the first sensor target is in at least one position along the fork shaft axis, the second sensor being coupled to the housing and being configured to sense the second sensor target and responsively generate a second sensor signal when the second sensor target is in at least one position along the fork shaft axis.

2. The transfer case of claim 1, wherein the resilient rotary coupling comprises a torsion spring.

3. The transfer case of claim 2, wherein the cam structure is non-rotatably coupled to an intermediate shaft and wherein the torsion spring is disposed in a torque transmission path between the motor output shaft and the intermediate shaft.

4. The transfer case of claim 1, wherein the second cam follower is slidably coupled to the second mount for movement along a cam follower axis that is parallel to the cam axis.

5. The transfer case of claim 4, wherein a cam follower spring biases the second cam follower away from the second mount and toward the cam structure.

6. The transfer case of claim 1, further comprising a fork spring that biases the second fork toward one of the third and fourth positions.

7. The transfer case of claim 6, wherein the fork spring is disposed about the fork shaft.

8. The transfer case of claim 1, further comprising an input shaft, a two-speed transmission, a first output shaft, a first sprocket, a second output shaft, a second sprocket, a chain, and a clutch, the input shaft and the first output shaft being supported for rotation by the housing, the two-speed transmission being driven by the input shaft and having a transmission output member that is non-rotatably but axially slidably coupled to the first output shaft, the transmission output member being movable along the first output shaft between a high range position, in which the two-speed transmission operates in a first gear ratio to transmit rotary power between the input shaft and the first output shaft, and a low range position in which the two-speed transmission operates in a second gear ratio to transmit rotary power between the input shaft and the first output shaft, the first sprocket being rotatably disposed on the first output shaft, the second output shaft being offset from the first output shaft and supported for rotation by the housing, the second sprocket being coupled to the second output shaft for common rotation, the chain being disposed about the first and second sprockets to transmit rotary power there between, the clutch having a first clutch member, which is coupled to the first output shaft for rotation therewith, a second clutch member, which is coupled to the first sprocket for rotation therewith, the clutch being operable in a first clutch mode in which the first and second clutch members are rotationally de-coupled from one another to inhibit transmission of rotary power between the first output shaft and the first sprocket, and a second clutch mode in which the first and second clutch members are rotationally coupled to one another to thereby permit transmission of rotary power between the first output shaft and the first sprocket.

9. The transfer case of claim 8, wherein the clutch comprises a third clutch member that is non-rotatably but axially slidably coupled to one of the first and second clutch members, the third clutch member being movable into engagement with the other one of the first and second clutch members when the clutch operates in the second clutch mode.

\* \* \* \* \*